(12) United States Patent
Sultani

(10) Patent No.: US 9,521,135 B2
(45) Date of Patent: Dec. 13, 2016

(54) METHOD AND SYSTEM FOR A COMPUTER-BASED, SECURED COMMUNICATION BETWEEN DATA PROCESSING UNITS

(71) Applicant: Omid Sultani, Hamburg (DE)

(72) Inventor: Omid Sultani, Hamburg (DE)

(73) Assignee: Omid Sultani, Hamburg (DE)

( * ) Notice: Subject to any disclaimer, the term of this patent is extended or adjusted under 35 U.S.C. 154(b) by 0 days.

(21) Appl. No.: 14/863,422

(22) Filed: Sep. 23, 2015

(65) Prior Publication Data

US 2016/0261578 A1     Sep. 8, 2016

(30) Foreign Application Priority Data

Mar. 4, 2015 (DE) .......... 10 2015 103 121

(51) Int. Cl.
*G06F 21/00* (2013.01)
*H04L 29/06* (2006.01)
*G06F 21/62* (2013.01)

(52) U.S. Cl.
CPC ............. *H04L 63/08* (2013.01); *G06F 21/62* (2013.01)

(58) Field of Classification Search
CPC ............. H04L 63/08; H04L 9/32; G06F 21/62
See application file for complete search history.

(56) References Cited

U.S. PATENT DOCUMENTS

| 8,744,143 B2* | 6/2014 | Chen ................. G06F 21/6245 348/143 |
| 8,909,725 B1 | 12/2014 | Sehn |
| 8,914,752 B1 | 12/2014 | Spiegel |
| 2008/0129758 A1* | 6/2008 | Fox ................... H04N 1/32128 345/661 |
| 2011/0149014 A1 | 6/2011 | Chung |
| 2012/0219053 A1 | 8/2012 | Snow et al. |
| 2013/0305383 A1 | 11/2013 | Garralda et al. |
| 2014/0229544 A1 | 8/2014 | Evans et al. |
| 2014/0258707 A1 | 9/2014 | Denny |
| 2015/0277638 A1* | 10/2015 | Bustamante ............ G06T 5/002 345/173 |

FOREIGN PATENT DOCUMENTS

| DE | 10201060282 A1 | 5/2012 | |
| GB | 2512140 A * | 9/2014 | ............ H04L 51/34 |

(Continued)

*Primary Examiner* — Kendall Dolly
(74) *Attorney, Agent, or Firm* — Patentbar International, P. C.

(57) ABSTRACT

In a method and a system for a computer-based and secured communication between data processing units a sender selects an alphanumeric and/or image data set, which is sent to at least one contact selected by sender out of a contact list. The selected contact is assigned an authorization by the sender, wherein the authorization is stored on the server. The selected alphanumeric and/or image data set is pixelated before sending it to the at least one selected contact. The pixelated data set is transmitted to a data processing unit of the at least one contact. The data processing unit of the at least one selected contact communicates with the server and the authorization is requested or obtained. At authorization of the contact, the pixelation of the pixelated data set, sent by sender, is removed.

14 Claims, 5 Drawing Sheets

(56) References Cited

FOREIGN PATENT DOCUMENTS

| | | |
|---|---|---|
| JP | 2014-089625 | 5/2014 |
| WO | 2012/087646 A2 | 6/2012 |
| WO | 2013/160539 A1 | 10/2013 |
| WO | WO2013/160539 * | 10/2013 |
| WO | 2014/194262 A2 | 12/2014 |

* cited by examiner

METHOD AND SYSTEM FOR A COMPUTER-BASED, SECURED COMMUNICATION BETWEEN DATA PROCESSING UNITS

RELATED APPLICATIONS

This application claims priority to German Patent Application No. 10 2015 103 121.3, filed Mar. 4, 2015, which is incorporated herein by reference in its entirety.

FIELD OF THE INVENTION

The present invention relates to a method for a computer-based, secured and controlled communication between at least two data processing units.

Moreover, the invention relates to a system for computer-based, secured and controlled communication between a data processing unit as a sender and at least one further data processing unit as receiver.

BACKGROUND OF THE INVENTION

The German patent application DE 10 201 060 282 discloses a method for computer-based communication. The computer-based communication, by which at least two users exchange messages and are shown images of the respectively other user, in particular takes place via the internet. The degree of recognition of the images changes during the communication process. After a certain number of exchanged messages, the recognizability is larger than 0% and smaller than 100%. The degree of getting to know each other or respectively the degree of building trust regulates the degree of recognizability. The two users are connected by means of a server. This system cannot guarantee a secure communication between mobile end devices or data processing units. Alphanumeric and/or image data sets cannot be sent in such a way that a security against access of other, non-authorized users is guaranteed.

U.S. Pat. No. 8,744,143 describes a method by which a protection of the privacy of uploaded images is possible. Thereunto a person is identified in a recorded image. A part of the image, which shows the person, is shown blurred, to avoid a recognizability of the person. The person is provided with a tag. The blurring is only removed, if a permission is given to the friend (respectively the other user). The permission can be achieved, e.g., by sending a message to the not recognizable person, provided with the tag. After the permission, other friends or the public of the social network can see the image and download it. If no permission is sent back, the image stays blurred.

The U.S. patent application US 2012/0219053 discloses a device for transmitting data, wherein the transmission occurs by means of an encrypted image. Thereunto a communication system with a first unit and a second unit is disclosed. The first unit comprises a storage medium, which stores the data, which are to be transmitted to the second unit. The encoded image to be transmitted can be shown on a display of the first unit. The camera of the second unit is directed to the display of the first unit in order to take a picture of the depicted image. The second unit sends a status report to the first unit, like e.g. the success of decoding. This method of transmission results in high data security, but the first and second unit have to be aligned to each other.

The U.S. patent application US 2014/0258707 A1 discloses a secure communication system between mobile devices. A direct communication between a sending mobile device and a receiving mobile device is described. The sending device requests a public key from the receiving device. The file to be transmitted is encrypted with the public key. The encrypted file can be transmitted as attachment of a message. The receiving device can decrypt the file with a private key and the public key, received before. Even if a third mobile device intercepts the encrypted file and the public key, the private key for decryption is missing at the third device.

The U.S. patent application US 2011/0149014 A1 discloses a communication system and a method in order to protect privacy. The mobile phone can be used during a communication to protect the privacy of the person being called. The mobile phone has a special unit for this purpose. Images and videos can be recorded by the camera. The program installed in the mobile phone can be used for protecting privacy during the video call. When the mobile phone is called, a dialogue box is generated on the display, by which a video transmission or the transmission of an image, stored in the storage medium, is permitted. An obfuscation of the transmitted alphanumeric and/or image data is not provided.

The British patent application GB 25 12 140 A discloses a system and a method for transmitting messages. A secure method is disclosed to determine if a screenshot was made by a receiver of a message. Furthermore it is prevented that screenshots can be made by an external camera. To this end, the image can for example be provided with a watermark. Thus the unauthorized recording of screenshots, and therefore their distribution, are more difficult. But it is not possible to transmit in this way alphanumeric and/or image data securely and in a manner that they are not readable by every third party.

The Japanese patent application JP 2014/89625 discloses a method for searching a person under regard of privacy. With the help of a search string, faces of persons can be searched for, who are shown in images on the internet and who have allowed this. In the case of persons who did not allow this, their faces are garbled to protect privacy.

The international patent application WO 2013/160539 discloses a method and a system to protect privacy in images. For this purpose, the first setting of a user relating to privacy is saved. Due to the first setting, the face of the user is recognized. The second setting is sent to a second user of a second mobile device. After a certain time, part of the image is shown blurred. An immediate transmission of alphanumeric and/or image data sets, made unrecognizable at transmission, is not disclosed here.

The U.S. Pat. No. 8,914,752 discloses a method for sending messages. The sent messages are deleted automatically after a certain period of time after first reading. Touching the display of the mobile device launches a timer, which provides the period of time. After expiry of the period of time, the transmitted message is deleted.

The international patent application WO 2014/194262 discloses a server with a module for messages. A processor executes instructions to maintain a message between a first user and a second user. Each item in the message is deleted after a predetermined time, unless a different instruction is given.

The U.S. Pat. No. 8,909,725 B1 reveals a server module, which determines push-criteria. Due to the push-criteria, objects (images with text, images or videos) are sent to one or more edge-servers, so that the request of a user is satisfied. Deletion criteria can also be defined, like for example that after viewing the object once, it gets deleted.

The U.S. patent application US 2013/0305383 A1 discloses a system and method to protect the privacy of multi-media data, uploaded on webpages by users. A server, on which an internet data protection service is implemented, receives a media element of a user of the social network. The media element (e.g. image) is encrypted. An agreement determines, who can view the media element. The encrypted media elements are stored securely in a cloud. The encrypted images are protected by means of DRM-protection and access control. A user with access rights can download the image and it can be viewed after the decryption.

Neither WhatsApp, facebook, Skype nor Snapchat offer a possibility to send alphanumeric and/or image data sets in such a way that a third party cannot recognize the content of the data sets. Only with authorization by the sender the receiver can view the alphanumeric and/or image data set on his data processing unit.

SUMMARY OF THE INVENTION

It is an object of the invention to provide a method for computer-based, secured communication between data processing units, regardless of the used operating system, by which messages, images, sound recordings and videos can be sent and received in an encrypted way. Besides, an unhindered distribution of these messages is to be avoided.

This object is achieved by a method for a computer-based, controlled and secured communication between a data processing unit of a sender and at least one data processing unit of a selected contact, characterized by the following steps:

selecting of an alphanumeric and/or image data set by the sender, which is sent by the sender to at least one contact selected from a contact list;

assigning of an authorization to the at least one selected contact by the sender, wherein the data processing unit of the sender communicates with a server, so that the authorization is stored on the server;

pixelating the selected alphanumeric and/or image data set prior to transmitting it to the at least one selected contact, and transmitting the alphanumeric and/or image data set as pixelated data set to a data processing unit of the at least one contact;

communicating of the data processing unit of the at least one selected contact with the server in order to request the authorization; and removing the pixelation of the pixelated data set, sent by the sender, when there is authorization of the contact.

It is a further object of the invention to provide a non-volatile computer-readable storage medium, which comprises computer-readable instructions by which it is possible to exchange messages between at least two data processing units in such a way that a third party cannot read the message and the recipient of the message can only read it, if he has an authorization to do so.

This object is achieved by a non-volatile computer-readable storage medium which contains computer-readable instructions, which are stored on the storage medium, wherein the computer-readable instructions are executable on at least one processor of at least one data processing unit of a sender and on at least one processor of a data processing unit of at least one contact, for establishing a computer-based, secured and controlled communication with at least one data processing unit of at least one contact, characterized by:

displaying an alphanumeric and/or image data set selected by the sender as a pixelated data set on a display of the data processing unit of the sender before sending it to the at least one selected contact;

selecting at least one contact from a contact list by the sender, to which contact the pixelated data set is to be sent;

transmitting an authorization to a server by the sender, and storing the authorization there, the authorization indicating that the at least one selected contact may view the alphanumeric and/or image data set in an un-pixelated manner;

communicating of the data processing unit of the at least one selected contact with the server in order to request the authorization, after receipt of a message of the sender that a pixelated data set has been sent; and removing the pixelation of the pixelated data set sent by the sender, if an authorization of the contact exists on the server.

A further object of the invention is to provide a system for computer-based, secured and controlled communication between data processing units, regardless of the used operating system, wherein it can be guaranteed in an easy way that transmitted alphanumeric and/or image data sets cannot be read by a non-authorized person.

This object is achieved by a system for a computer-based, secured and controlled communication between a data processing unit as sender and at least one further data processing unit as receiver, comprises:

a server, to which the data processing unit of the sender and the at least one further data processing unit are communicatively coupled;

a processor of the data processing unit of the sender, wherein on the processor an application program is executable, which creates a pixelated data set from an alphanumeric and/or image data set;

an input means for selecting at least one contact, to which the pixelated data set can be sent, and which is authorized to view the alphanumeric and/or image data set in an un-pixelated manner, wherein the authorization is stored on the server by the data processing unit of the sender; and a processor of the at least one further data processing unit on which the application program also is executable in order to restore the alphanumeric and/or image data set out of the pixelated data set, wherein before executing the application program the authorization is requestable from the server by the further data processing unit of the at least one contact.

The method for a computer-based, secured and controlled communication between a data processing unit of a sender and at least one data processing unit of a selected contact is characterized by the following steps:

selecting of an alphanumeric and/or image data set by the sender, which is sent by the sender to at least one contact selected from a contact list;

assigning of an authorization to the at least one selected contact by the sender, wherein the data processing unit of the sender communicates with a server, so that the authorization is stored on the server;

pixelating the selected alphanumeric and/or image data set prior to transmitting it to the at least one selected contact, and transmitting the pixelated data set to a data processing unit of the at least one contact;

communicating of the data processing unit of the at least one selected contact with the server in order to request the authorization; and removing the pixelation of the pixelated data set, sent by the sender, when there is authorization of the contact.

The sent and pixelated data set can be provided with a logo of the application program. Wherein the logo shows an authorized contact that for viewing the received and pixelated data set in a un-pixelated manner, the application program has to be loaded on the data processing unit first.

This concept has the advantage that messages, images, sound recordings and videos can be sent and received in an encrypted manner with the application program. For viewing the sent data sets in a decrypted way, the corresponding application program has to be loaded on the corresponding data processing unit. Besides, it is ensured that if a non-authorized contact receives the data set, the data set is of no use to him, since he cannot remove the encryption or the pixelating, respectively, from the sent data set. The un-authorized contact has no advantage from a further distribution of the sent and pixelated data sets, because a further receiver is not able to decrypt this sent and pixelated data set, or view it in an un-pixelated manner, respectively, either.

Besides, a non-authorized contact, who received a pixelated data set, can send a message to the sender, to receive an authorization for viewing the received alphanumeric and/or image data set in a un-pixelated manner. In case the sender gives an authorization to the non-authorized contact, the sender informs the server. The formerly un-authorized contact then receives the authorization for viewing the alphanumeric and/or image data set in a un-pixelated manner from the server.

Besides, it is possible in an embodiment of the method according to the invention, to prevent a screenshot of the un-pixelated received alphanumeric and/or image data set by an authorized contact. In case an authorized contact makes a corresponding screenshot, the screenshot is at least partially garbled. In addition, the screenshot can be provided with an identification of the authorized contact. This has the advantage that, if a non-pixelated data set with a corresponding identification appears on the internet or in corresponding social networks, this non-pixelated data set can be unambiguously related to a person. The authorization of this authorized contact can be revoked, which can be done at the central server. A hint to that can e.g. be put in the terms and conditions for using the application program according to the invention.

Furthermore it can happen that an un-pixelated alphanumeric and/or image data set, received by the data processing unit of an authorized contact, is photographed by a further data processing unit. At photographing, the alphanumeric and/or image data set is also provided with an identification, and, as mentioned above, the authorization of the formerly authorized contact can be revoked, if necessary.

The alphanumeric and/or image data sets, received by at least one authorized contact, are stored in an album assigned to the application program. Sending of a received alphanumeric and/or image data set always happens in a pixelated manner, and no further authorizations are assigned except for those already assigned by the original sender.

Data processing units are preferably mobile devices and the data consisting essentially, of image data, contact data and alphanumeric data which are stored in a cloud. The advantage of the cloud storage is that the data can be retrieved regardless of the system used by the mobile devices.

Likewise, a non-volatile computer-readable storage medium can be provided, which contains computer-readable instructions stored on the storage medium. The computer-readable instructions are executable on at least one processor of at least one data processing unit of the sender and on at least one processor of a data processing unit of at least one contact. This application program makes possible a computer-based, secured and controllable communication with at least on data processing unit of at least one further contact. Besides, the un-controlled distribution of alphanumeric and/or image data sets is limited. An alphanumeric and/or image data set, selected by the sender, is shown as a pixelated data set on a display of the data processing unit of the sender prior to transmitting it to the at least one selected contact. The sender therein selects at least one contact from a contact list, which the pixelated data set is sent to. An authorization is transmitted to a central server by the sender and saved there. The authorization indicates that the at least one selected contact may view the alphanumeric and/or image data set in a un-pixelated manner. After receiving a message of the sender, that a pixelated data set has been sent, the data processing unit of the at least one selected contact communicates with the server and requests the authorization. The authorization is checked by the server in real time and if the authorization exists, the contact can remove the pixelation of the pixelated data set sent by sender.

The computer-readable instructions on the non-volatile computer-readable storage medium also make it possible to provide the sent and pixelated data set with a logo of an application program comprising the computer-readable instructions. The logo therein shows an authorized contact that for viewing the received pixelated data set in a un-pixelated manner, first the application program has to be loaded on the data processing unit.

The system for a computer-based, secured and controlled communication between a data processing unit as a sender and at least one further data processing unit as receiver includes a server, to which the data processing unit of the sender and the at least one further data processing unit are communicatively connected. Furthermore, a processor of the data processing unit of the sender is provided, on which an application program is executable. The application program generates a pixelated data set out of an alphanumeric and/or image data set. Via an input means of the data processing unit of the sender at least one contact can be selected, to which the pixelated data set is sent. This selected contact thus is also authorized for viewing the alphanumeric and/or image data set in an un-pixelated manner. The authorization has been deposited on the server by the data processing unit of the sender. A processor of the at least one further data processing unit, on which the application program is executable, too, restores the alphanumeric and/or image data set from the pixelated data set. For executing the application program with the further data processing unit of the at least one contact, first the authorization has to be obtained or requested from the server.

Although the following description refers to mobile devices as data processing units only, this should not be understood as a limitation for the invention. It is obvious for a skilled person, that the invention can be implemented in various data processing units.

The application program (APP) according to the invention is intended to run mainly on mobile devices (smartphones). The application program runs under iOS (Apple) and Android operating systems. In addition, the application program includes the basic functions of WhatsApp. Users or contacts, respectively, can send and receive messages with the application program. This is realized in a server environment. Users or contacts, respectively, can see from a bar, if another user is online or if he is typing.

Another possibility of the application program according to the invention is that a user can write a message and eventually determines, at what time this message becomes viewable for another user or contact, respectively. For this purpose, a timer is set, which specifies that the message is sent at a specific time and hence becomes viewable for another user or respectively another contact. It is possible as well that the message becomes viewable for a second user only at a certain instant of time.

The application program has the advantage that encrypted messages can be sent. The message can be text messages, images, sound recordings and videos, which can be sent and received in an encrypted manner. The application program will have similar functions as facebook, as well. The application program will have a photo album. Images can be commented on there. The application will also comprise a pin board. The users of the application program can design their profiles and fill them with information. A homepage can be related, as well.

Furthermore, images can be uploaded into social networks by means of the application program. These images can be published at a certain time, as in the case of sending messages. The duration of time, until the photo will be published on facebook, is shown to the sender, so the sender can see, at any time, how long this will still take.

As mentioned before, it is possible to send messages in an encrypted manner with the application program. With the application program according to the invention, the encryption is achieved, because the messages are pixelated and therefore not readable for any third party. Therefore the messages are sent in a pixelated manner. Before sending in a pixelated manner, the sender can assign certain clearances in his own contact list. These clearances or authorizations are transmitted to the server. By means of the clearance function, one's personal information can be protected from other users (not authorized contacts). Before the message is sent out of the application program, the application program asks, who has the authorization (clearance) to see the message in an un-pixelated manner. After the persons (contacts) have been selected, the message can be sent without risking that un-authorized persons read this message. Persons, who do not have the application program on their mobile devices, also will only see a pixelated image of the message. A high-performance server, which communicates with the mobile devices, calculates the sending and the clearance to view the pixelated messages in an un-pixelated manner in real time. According to a further design of the application program, it is possible that messages are provided with an expiration date. Users can choose and determine due to the option, how long a sent message (video or image) and other personal information remain visible for another user. The time, during which the image is visible, can be set by the sender via a controller graphically represented on the display of the mobile device. After the time is up, the image, video, and the personal information are deleted automatically.

To ensure that a distribution of sent images, messages, videos, and the like is not possible, it must be prevented that screenshots of the messages sent from the application program are made without control. In case a user made a screenshot with his mobile device, according to a possible embodiment, a pixelated or homogeneously colored image (e.g. colored black) is saved automatically. It is also possible that the image is garbled by graphical elements. In addition to garbling the image or message, respectively, contact details of the user who made the screenshot can be shown on the image. Thus there is the possibility to exclude a user who contravenes the terms and conditions of the application program repeatedly from using the application program. In case the un-pixelated massage is photographed with a further mobile device from another mobile device, a user name or other contact information may be shown permanently at an edge of the display. Such photographed messages or images can therefore only be spread with the user name. In case this is noticed, this user can be excluded from using the application program, as well.

Furthermore it is useful that the pixelated messages are provided with a logo of the application program with which it is possible to view the message in an un-pixelated manner. A user who does not have this application program on his mobile device yet, therefore can download the application program, in order to view the pixelated message in an un-pixelated manner, if he has an authorization. Messages which are spread are always provided with information about the user. This has the advantage that a user can be recognized and found.

Furthermore it is possible to provide the application program with game features. Users have the possibility e.g. to mix images and cut them as a jigsaw puzzle. A user can therefore send an image as a jigsaw puzzle to another user. The user who receives the puzzle can solve it and send it back. Another possibility of a game feature is that the users see an image and after that things are removed from the image. The user is to find out, which things are missing on the image. The things which might miss are shown as a tool box on the bottom edge of the display of the mobile device. After inserting the missing things, one is rewarded by a points system. Besides, all this is intended to provide more entertainment.

BRIEF DESCRIPTION OF THE DRAWINGS

In what follows, embodiments shall illustrate the invention and its advantages with reference to the accompanying drawings. The size ratios in the figures do not always correspond to the real size ratios, since some shapes are shown in a simplified manner and other shapes are shown enlarged in comparison to other elements for a better illustration. It is remarked here again that the description below refers to mobile devices (smartphones) only. This is not to be understood as a limitation of the invention, however. There is shown in.

DETAILED DESCRIPTION OF THE INVENTION

Figure 1:
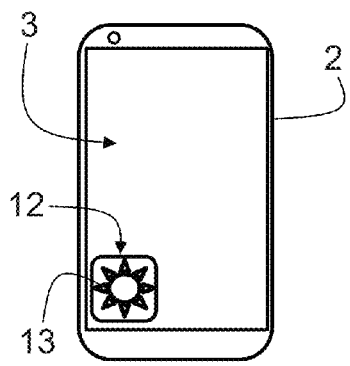
FIG. 1 is a schematic top view of a mobile device (smartphone)

For like elements of the invention or elements of like function, identical reference numerals are used. In addition, only reference numerals are shown in the individual figures because of clarity reasons, which are necessary to describe the particular figure.

FIG. 1 shows a schematic view of a mobile device 2 (smartphone), with which a user can invoke the application program 12 according to the invention, in order to send alphanumeric and/or image data sets 10 (see FIG. 3) with the application program 12 according to the invention. The application program 12 is shown with a logo 13 on a display 3 of the mobile device 2. The application program 12 can be invoked through the logo 13.

Figure 2:
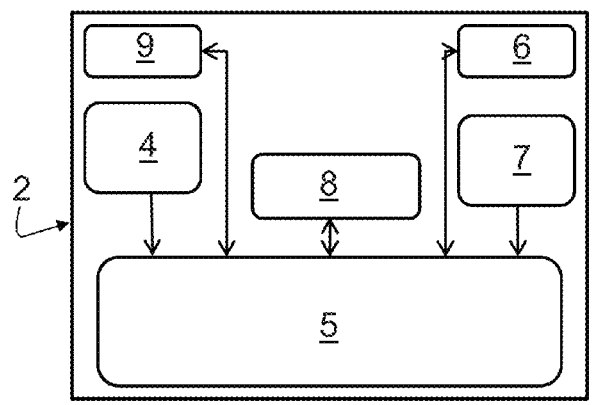
FIG. 2 is a schematic view of the elements of a mobile device.

FIG. 2 shows a schematic view of the mobile device 2 with the required equipment for carrying out the application program 12 according to the invention. The mobile device 2 has a processor 5, with which computer-readable instructions of the application program 12 are executable. In addition, a non-transitory computer-readable storage medium 6 is provided, in which the computer-readable instructions are stored. The computer-readable instructions are requested from the storage medium 6 through the processor 5. In addition a camera 4 of the mobile device 2 is connected communicatively with the processor 5. The processor 5 thus processes the images recorded by the camera 4. The processor 5 is also connected with a wireless transceiver 9. The processor 5 is also connected with an input means 7, with which the user of the mobile device 2 can give instructions and provide input, which are executed by the processor 5 of the mobile device 2. In addition, the processor 5 is connected in a bidirectional manner with a communication means 8.

Figure 3:
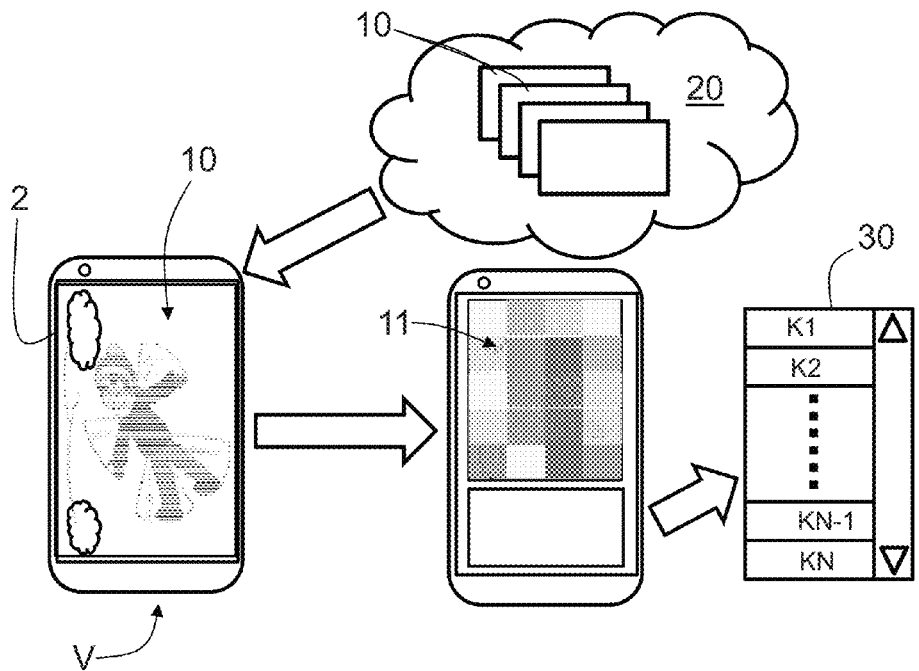
FIG. 3 is a schematic view of the sending process of messages from a mobile device of a sender.

FIG. 3 shows a schematic view of the process of sending alphanumeric and/or image data sets 10. Plural alphanumeric and/or image data sets 10 are stored in a cloud 20. The data sets consist essentially of image data, contact data and/or alphanumeric data are stored in a cloud 20. The user of a mobile device 2 can retrieve at least one of these alphanumeric and/or image data sets 10 from the cloud 20 for display on the display 3 of the mobile device 2. The advantage of the use of a cloud is that the data can be retrieved regardless of used operating system. In the embodiment shown here, the alphanumeric and/or image data set 10 is an image. With the application program 12, installed on the mobile device 2, the user of the mobile device 2 can generate a pixelated data set 11 out of the alphanumeric and/or image data set 10. Before sending this pixelated data set 11, the user selects, from a contact list 30, those contacts K1, K2, . . . , KN, which are allowed to view the alphanumeric and/or image data set 10 in an un-pixelated manner.

Figure 4:
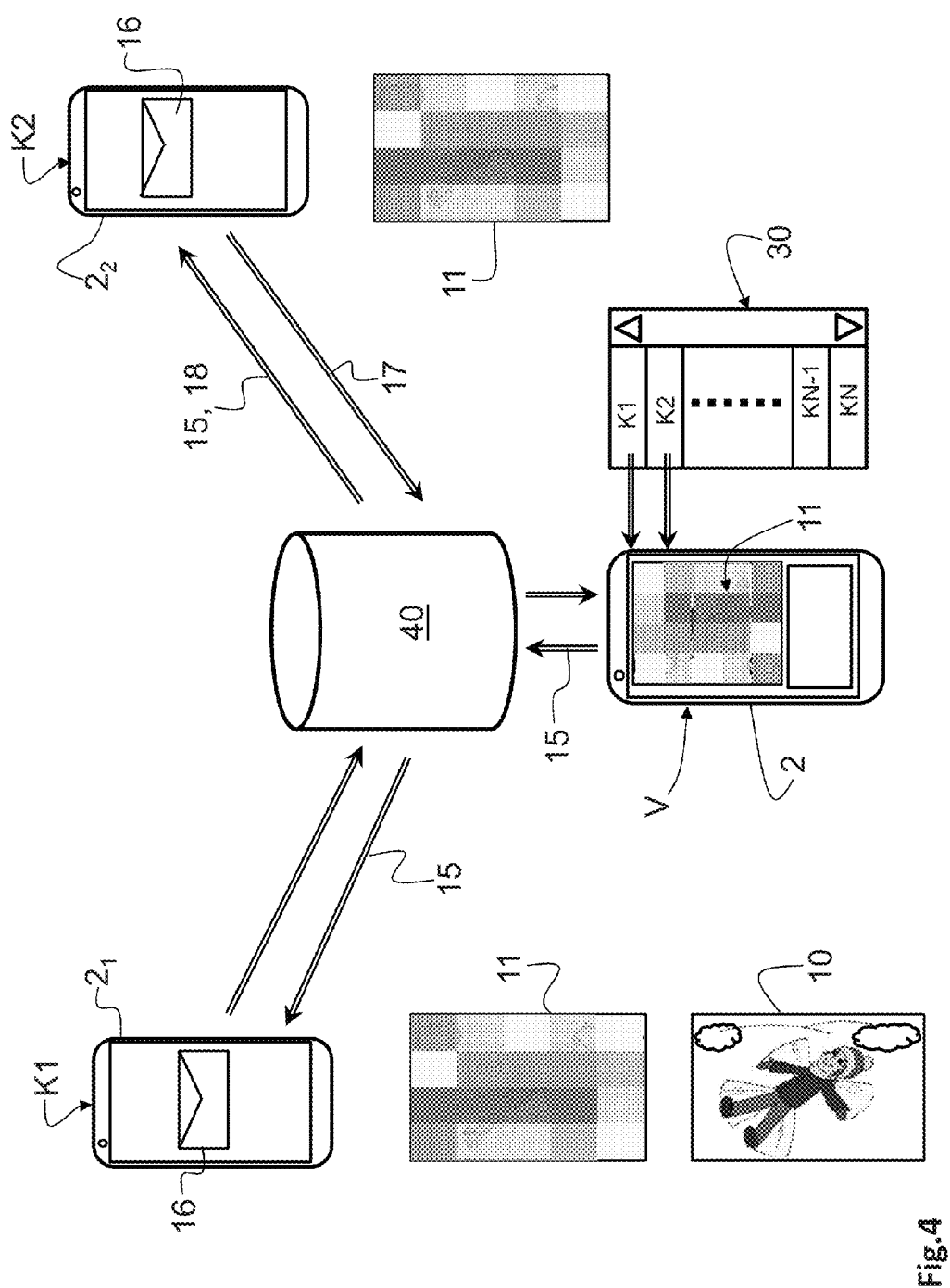
FIG. 4 is a schematic view of the system according to the invention, wherein plural mobile devices communicate with a central server.

FIG. 4 shows a schematic view of the process of the method, with which a pixelated data set 11 is sent and how this pixelated data set 11 can be viewed in an un-pixelated manner by one of the authorized contacts K1, K2, . . . , KN. As already mentioned in the description of FIG. 3, a sender V selects those contacts K1, K2, . . . , KN on his mobile device 2, which are allowed to view the pixelated data set 11 sent by sender V in an un-pixelated manner. In the description, shown here, the sender V selects the contacts K1 and K2. The selection of the contacts K1 and K2 reaches a server 40 from the mobile device 2 of the sender V with an authorization 15. In addition the server 40 is told that the contacts K1 and K2 should receive a message 16 that a pixelated data set 11 has been sent by the sender V. The contact K1 now invokes the application program 12 on his mobile device 21 (see FIG. 1) and converts the pixelated data set 11 into an alphanumeric and/or image data set 10, which is un-pixelated. The user K1 now can view the image 10 in an un-pixelated manner with the application program 12. Before this the mobile device 21 of the contact K1 checks through the server 40, if the contact K1 possesses an authorization 15 to view a pixelated data set 11 in an un-pixelated manner.

The contact K2 has been shown as well by a message 16 that he received a pixelated data set 11 from the sender V. The user K2 in this case also possesses the required application program 12. Therefore the user K2 transmits a message 17 to the server 40 that he is not authorized to see the pixelated data set 11 in an un-pixelated manner. In case he is given the authorization 15 by sender V, he receives a feedback 18 via the server 40, with which he is given the authorization 15. With the application program 12 on his mobile device 22, he can eventually view the pixelated data set 11 in an un-pixelated manner.

Figures 5, 6:
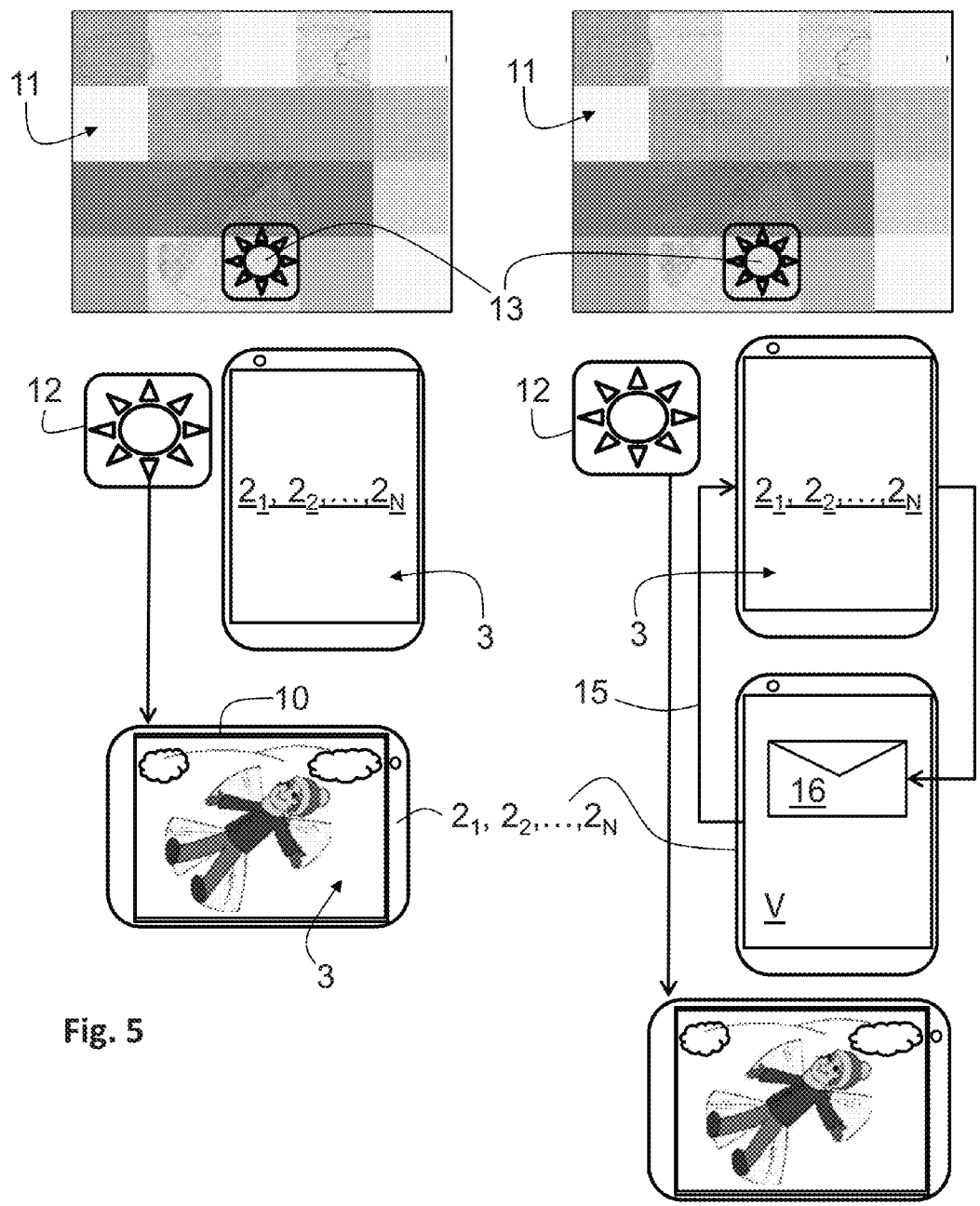
FIG. 5 is a schematic view of the process, if a user has an authorization for viewing the pixelated messages.
FIG. 6 shows a schematic view of a process, if an authorized user has not loaded the application program, required for the un-pixelated viewing of the message, on a mobile device yet.

FIG. 5 shows a schematic description of the situation in which a contact K1, K2, . . . , KN has loaded the application program 12 on his mobile device 21, 22, . . . 2N. The contact K1, K2, . . . , KN receives a pixelated data set 11 from the sender V, on which also the logo 13 of the application program 12 is shown. Since he is an authorized contact K1, K2, . . . , KN, by invoking the application program 12 on the display 3 of the mobile device 21, 22, . . . 2N, he can process the pixelated data set 11 in such a way that the un-pixelated image 10 is shown on the display 3 of the mobile device 21, 22, . . . 2N.

In FIG. 6 the situation is shown that a contact K1, K2, . . . , KN receives the pixelated data set 11, but cannot view it in a un-pixelated manner, because he does not have the required application program 12. Since the logo 13 of the application program 12 is shown on the pixelated data set 11, the contact K1, K2, . . . , KN can send a message 16 to the sender V and request to be granted an authorization 15 for viewing the pixelated data set 11 in an un-pixelated manner. In addition, the contact K1, K2, . . . , KN can load the application program 12 on his mobile device 21, 22, . . . 2N. After he has received the authorization 15 from sender V, he can clear the pixelated data set 11 with the application program 12 and view the image 10.

The entire communication with the server 40 (see FIG. 4) in FIGS. 5 and 6 and the calculation and identification of the authorizations happens on the server 40 in real time. A user of the application program 12 therefore does not notice a time lag when viewing or clearing, respectively, the pixelated data set 11.

Figure 7:
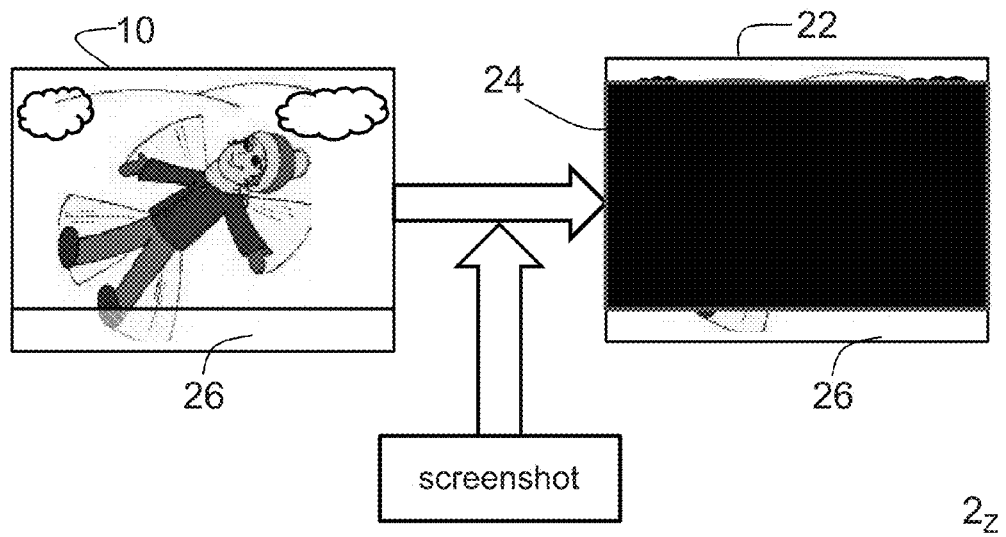
FIG. 7 is a schematic view of a possible embodiment, in which a user makes a screenshot of an un-pixelated image.

FIG. 7 shows a situation in which an authorized contact K1, K2, . . . , KN makes a screenshot 22 of the image 10 shown on the display 3, in order to distribute this screenshot 22 without restrictions in other social networks. In order to prevent this, e.g. a black area 24 can be placed on the screenshot 22 made, as shown in FIG. 7. It is obvious to a skilled person, that for this purpose any type of obfuscation of the image 10 produced by a screenshot 22, is possible. It is possible as well that the identification 26 of the authorized user K1, K2, . . . , KN is inserted in the image 10. By this identification 26, it can be determined who made the screenshot 22, which now circulates in social networks without pixelation.

Figure 8:
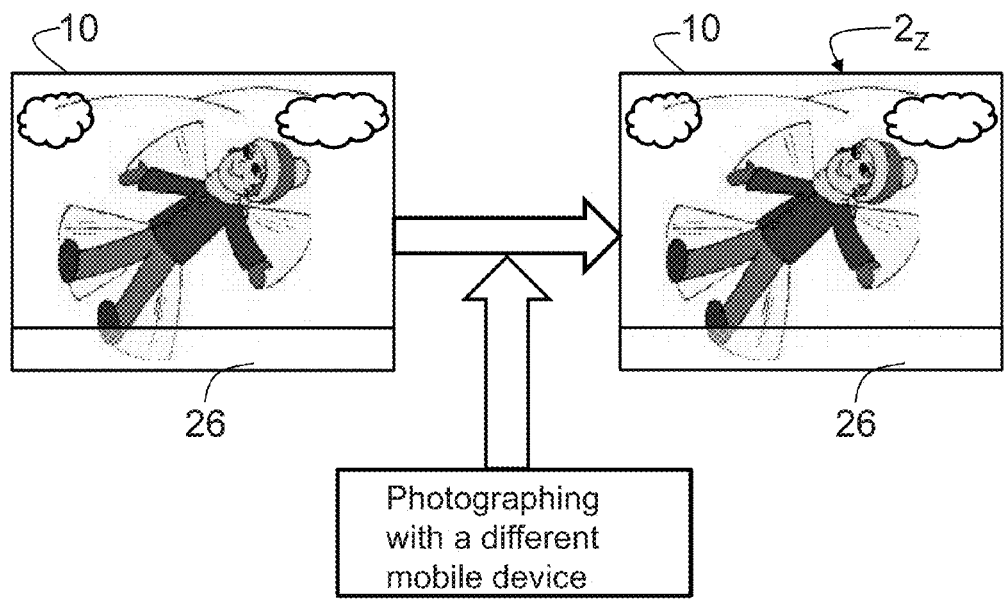
FIG. 8 is a schematic view of an embodiment, in which a user photographs an image, shown on a display of the mobile device, with a different mobile device; and in FIG. 9 is schematic view of the process of a delayed sending of messages.

FIG. 8 shows another possibility, in which the display 3 of the mobile device 21, 22, . . . 2N of the receiver is photographed with an additional mobile device 2z. To find out whether the un-pixelated image 10 has been photographed with an additional mobile device 2z, an identification 26 is inserted in the original on the mobile device 21, 22, . . . 2N of the receiver. Therefore it can always be recognized that an image has been photographed by an additional mobile device 2z. Thus the contact K1, K2, ..., KN, which photographed the image, can always be found. According to the terms and conditions of the application program 12, the authorization of the user for using the application program 12 can be revoked.

The invention also has the advantage that the application program 12 according to the invention is protected by a code or a pattern. Therefore, even in case of losing the mobile device 21, 22, ... 2N, it is ensured that only the authorized user of the mobile device 21, 22, ... 2N can invoke the application program 12, and therefore view the authorized images in an un-pixelated manner. It is also an advantage that the images in the album assigned to the application program can be opened at any time, since it is an advantage, as mentioned above, to store the images or alphanumeric and/or image data sets 10, respectively, assigned to the application program 12, in a cloud 20.

Figure 9:
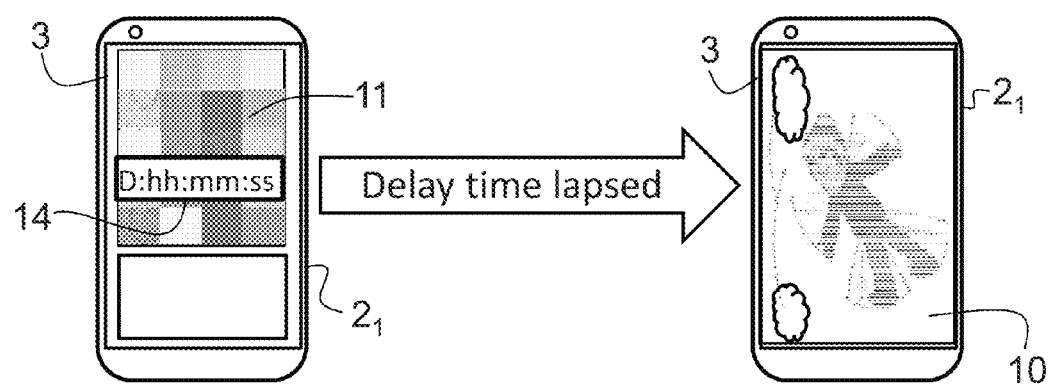

FIG. 9 shows an embodiment of the process of a delayed sending of messages. The message in an alphanumeric and/or image data sets 10. In the embodiment shown here at least one authorized contact K1, K2, ..., KN receives from the user of a mobile device 2 a pixilated alphanumeric and/or image data set 11. In parallel to pixilated alphanumeric and/or image data set 1ithe authorized contact K1, K2, ..., KN gets a timer 14 on the display 3 of his mobile device $2_1$. The timer 14 indicates the time which is still running before the at least one authorized contact K1, K2, ..., KN can view the alphanumeric and/or image data set 10 in an un-pixelated manner. The authorized contact K1, K2, ..., KN is informed by the display of the timer that a message is sent and the can view the message after the delay time has lapsed. Even a non-authorized contact is informed by the timer on the pixelated data set 11 that has received a message and he is able to view the message in case he downloads the application program 12. The download is eased by the display of the logo 13 of the application program 12 on the pixelated data set 11.

LIST OF REFERENCE NUMERALS 2 mobile device/data processing unit of sender
$2_1$, $2_2$, ... $2_N$ mobile device/data processing unit of receiver
$2_Z$ additional mobile device
3 display
4 camera
5 processor
6 storage medium
7 input means
8 communication means
9 wireless transceiver
10 alphanumeric and/or image data set; image
11 pixelated data set
12 application program
13 logo
14 timer
15 authorization
16 message
17 message of an unauthorized contact
18 feedback
20 cloud
22 screenshot
24 black area
26 identification
30 contact list
40 server
K1, K2, ..., KN contact
V sender

What is claimed is:

1. A method for a computer-based, controlled and secured communication between a data mobile device of a sender and at least one mobile device of a selected contact, the method comprising:
    storing an alphanumeric or image data set in a cloud network of remote servers hosted on the Internet;
    selecting of the alphanumeric or image data set by the sender, which is sent via the mobile device of the sender to the mobile device of at least one selected contact selected by the sender from a contact list;
    assigning of an authorization to the mobile device of the at least one selected contact by the sender, wherein the mobile device of the sender communicates with one of the remote servers in real time, and storing the authorization on the one remote server;
    pixelating the selected alphanumeric or image data set prior to transmitting it to the mobile device of the at least one selected contact, and transmitting the alphanumeric or image data set as pixelated data set to the mobile device of the at least one contact;
    communicating of the mobile device of the at least one selected contact with the one remote server in order to request the authorization from the one remote server in real time;
    removing the pixelation of the pixelated data set sent via the mobile device of the sender when there is authorization of the contact; and
    providing the sent and pixelated data set with a logo of an application program, wherein the logo shows an authorized contact whereby the application program is loaded onto the mobile device for viewing, on a screen of the mobile device of the at least one selected contact, the received pixelated data set in an un-pixelated manner.

2. The method according to claim 1, further comprising sending a message to the sender via a device of a non-authorized contact in order to receive an authorization for viewing the received alphanumeric or image data set in an un-pixelated manner, and transferring the authorization to the one remote server.

3. The method according to claim 1, further comprising providing a screenshot, on a screen of the mobile device of the at least one selected contact, of the un-pixelated received alphanumeric or image data set made by an authorized contact at least partially garbled or with an identification of the authorized contact.

4. The method according to claim 1, further comprising providing the un-pixelated alphanumeric or image data set with an identification if an un-pixelated alphanumeric or image data set is photographed off the data mobile device of an authorized contact by another mobile device.

5. The method according to claim 1, further comprising saving the alphanumeric or image data sets, received from the mobile device of the at least one authorized contact in an album assigned to the application program, and carrying out sending of the received alphanumeric or image data set out in a pixelated manner and assigning no further authorizations except for those already assigned by the original sender.

6. The method according to claim 1, wherein the mobile device of the sender is a smartphone device, and the at least one mobile device of the selected contact is a smartphone device.

7. The method according to claim 1, further comprising sending the alphanumeric or image data set to the mobile device of the at least one selected contact via a timer in a time delayed manner.

8. The method according to claim 7, further comprising displaying a timer in the pixelated data set so that the mobile device of the selected contact receives information that the data set has been received and the pixelated data set can be viewed on a screen of the mobile device of the selected contact in an un-pixelated manner after a lapse of time of the timer.

9. A non-transitory computer-readable storage medium with computer-readable instructions stored on the storage medium, the computer-readable instructions being executable on at least one processor of a mobile device of a sender and on at least one processor of a mobile device of at least one contact, for establishing a computer-based, secured and controlled communication with at least one mobile device of at least one contact, the computer readable instructions when executed by the processor perform:
    storing an alphanumeric or image data set in a cloud network of remote servers hosted on the Internet;
    displaying an alphanumeric or image data set selected by the sender as a pixelated data set on a display of the mobile device of the sender before sending it to the mobile device of the at least one selected contact;
    selecting at least one contact from a contact list by the sender and sending the pixelated data set to the mobile device of the at least one selected contact;
    transmitting by the sender an authorization to one of the remote servers, and storing the authorization on the one remote server, the authorization indicating that the at least one selected contact may view the alphanumeric or image data set in an un-pixelated manner on a display of the mobile device of the at least one selected contact;
    communicating of the mobile device of the at least one selected contact with the one remote server in real time in order to request the authorization after receipt of a message of the sender that a pixelated data set has been sent; and
    removing in real time the pixelation of the pixelated data set sent by the sender if an authorization of the contact exists on the one remote server
    wherein the sent and pixelated data set is provided with a logo of an application program comprising the computer-readable instructions, the logo indicating to an authorized contact that an application program is to be loaded on the mobile device for viewing, on a screen of the mobile device of the at least one selected contact, the received pixelated data set in an un-pixelated manner.

10. The non-transitory computer-readable storage medium with the computer-readable instructions according to claim 9, further generating a message for the sender by a non-authorized contact in order to receive an authorization for viewing the received pixelated alphanumeric or image data set in an un-pixelated manner, and transferring the authorization to the one remote server by the mobile device of the sender.

11. The non-transitory computer-readable storage medium with the computer-readable instructions according to claim 9, further providing a screenshot, on a screen of the mobile device of the at least one selected contact, of the un-pixelated received alphanumeric or image data set at least partially garbled or with an identification of the authorized contact.

12. The non-transitory computer-readable storage medium with the computer-readable instructions according to claim 9, wherein the mobile device of the sender is a smartphone device, and the at least one mobile device of the selected contact is a smartphone device.

13. A system for a computer-based, secured and controlled communication between a mobile device as sender and at least one further mobile device as receiver, the system comprising:
    a cloud network of remote servers hosted on the Internet for storing an alphanumeric or image data set;
    one of the remote servers communicatively coupled to the mobile device of the sender and the at least one further mobile device;
    a processor of the mobile device of the sender with an application program executable by the processor, the program generating a pixelated data set from an alphanumeric or image data set;
    an input device of the mobile device of the sender for allowing the sender to select at least one contact to which the pixelated data set can be sent, the input device being authorized to view the alphanumeric or image data set in an un-pixelated manner, wherein the authorization is stored on the one remote server by the mobile device of the sender; and
    a processor of the at least one further mobile device with the application program loaded thereon and executable by the processor in order to restore the alphanumeric or image data set out of the pixelated data set, wherein the further mobile device of the at least one contact requests the authorization from the one remote server before executing the application program in real time;
    wherein the pixelated data set shows a logo of the application program, and wherein the logo is a button by which the application program is loadable on the at least one mobile device for viewing, on a screen of the mobile device of the at least one selected contact, the received pixelated data set in an un-pixelated manner.

14. The system according to claim 13, wherein the application program is designed in such a way in the mobile device that a screenshot of the un-pixelated received alphanumeric or image data set is garbled at least partially or is provided with an identification of the mobile device, with which the screenshot was made.

* * * * *